US006928367B2

(12) United States Patent
Gray et al.

(10) Patent No.: US 6,928,367 B2
(45) Date of Patent: Aug. 9, 2005

(54) RESERVOIR FRACTURE CHARACTERIZATION

(75) Inventors: Frederick David Gray, Calgary (CA); Abdel M. Zellou, Bourg La Reine (CA); Dragana Todorovic-Marinic, Calgary (CA); Sean T. Boerner, Cypress, TX (US)

(73) Assignee: Veritas DGC Inc., Houston, TX (US)

( * ) Notice: Subject to any disclaimer, the term of this patent is extended or adjusted under 35 U.S.C. 154(b) by 0 days.

(21) Appl. No.: 10/672,045

(22) Filed: Sep. 26, 2003

(65) Prior Publication Data

US 2004/0117121 A1 Jun. 17, 2004

(Under 37 CFR 1.47)

Related U.S. Application Data (60) Provisional application No. 60/414,434, filed on Sep. 27, 2002.

(51) Int. Cl.⁷ .............................. G01V 1/40; G01V 1/00
(52) U.S. Cl. ........................................... 702/11; 367/56
(58) Field of Search ............................. 702/11; 367/56; 703/10

(56) References Cited

PUBLICATIONS

Zellou et al., Improved Fractured Reservoir Characterization Using Neural Networks, Geomechanics and 3–D Seismic, 1995, SPE 30722, pp. 205–215.*

Ouenes et al., Fractured Reservoir Characterization and Performance Forecasting Using Geomechanics and Artificial Intelligence, 1995, SPE 30572, pp. 425–436.*

Hall et al., Fractured reservoir Characterization Using P–Wave AVOA Analysis of 3D OBC Data, Aug. 2002, The Leading Edge, pp. 777–781.*

Gray et al., Fractured Detection in Manderson Field: A 3–D AVAZ Case History, Nov. 2000, The Leading Edge, pp. 1214–1221.*

Letter from co–inventor Abdel M. Zellou with attached claims having annotations by Abdel M. Zellou (7 p.).

Gauthier, B.D.M., et al., "Integrated Fractured Reservoir Characterization: A Case Study In A North Africa Field." Society Of Petroleum Engineers, Paper No. SPE 65118, Oct. 24–24, 2000, 11 pages, Paris, France.

Ouenes, Ahmed et al., "Fractured Reservoir Characterization And Performance Forecasting Using Geomachinics And Artificial Intelligence," Society Of Petroleum Engineers, Paper No. SPE 30572, Oct. 22–25, 1995, pp. 425–436, Dallas, Texas.

Ouenes, Ahmed, "Practical Application Of Fuzzy Logic And Neural Networks To Fractured Reservoir Characterization," Computers & Geosciences, 26, 2000, pp. 953–962.

Ouenes, Ahmed et al., "Practical Use Of Neural Networks In Tight Gas Fractured Reservoirs: Application To The San Juan Basin," Society Of Petroleum Engineers, Paper No. SPE 39965, Apr. 5–8, 1998, pp. 573–580, Denver, Colorado.

(Continued)

*Primary Examiner*—Bryan Bui
*Assistant Examiner*—Toan M. Le
(74) *Attorney, Agent, or Firm*—Conley Rose, P.C.

(57) ABSTRACT

Systems and methods of reservoir fracture characterization are disclosed. In one embodiment, the method includes: 1) obtaining seismic traces; 2) combining seismic traces into gathers that reveal acoustic reflectivity as a function of offset, azimuth, and position; 3) measuring reflection anisotropy as a function of position; 4) determining a relationship between reflection anisotropy and fracture intensity measurements at specific positions; and 5) applying the relationship to reflection anisotropy measurements to create a set of fracture intensity measurements at regularly-spaced positions.

18 Claims, 4 Drawing Sheets

OTHER PUBLICATIONS

Zellou, Ahmed M. et al., "Improved Fractured Reservoir Characterization Using Neural Networks, Geomechanics And 3–D Seismic," Society Of Petroleum Engineers, Paper No. SPE 30722, Oct. 22–25, 1995, pp. 205–215, Dallas, Texas.

Zellou, Ahmed M. et al., "Integrated Fractured Reservoir Characterization Using Neural Networks And Fuzzy Logic: Three Case Studies," Journal Of Petroleum Geology, vol. 24, No. 4, Oct., 2001, pp. 459–476.

A.M. Zellou and A. Ouenes, Integrated Fractured Reservoir Characterization Using Neural Networks and Fuzzy Logic: Three Case Studies, Journal of Petroleum Geology, Oct. 2001, pp. 1–18, vol. 24(a), Scientific Press Ltd., UK.

A. Ouenes et al., Practical Use of Neural Networks in Tight Gas Fractured Reservoirs: Application to the San Juan Basin, 1998, pp. 1–8, SPE 39965, Society of Petroleum Engineers, Inc., Richardson, Texas.

* cited by examiner

RESERVOIR FRACTURE CHARACTERIZATION

REFERENCE TO RELATED APPLICATIONS

The present application claims priority to Provisional U.S. Patent Application 60/414,434, which was filed Sep. 27, 2002. The provisional application is incorporated herein by reference.

BACKGROUND

The field of hydrocarbon production is directed to retrieving hydrocarbon fluids from where they are trapped in subterranean formations. Oil (or gas) wells are drilled into reservoirs where hydrocarbon fluids permeate the rock formations. Hydrocarbons flow from surrounding formations into the well and up the well bore to the surface. An important consideration to hydrocarbon production companies is the production rate, i.e., the rate at which hydrocarbons can flow into the well.

Many formations have low porosity and/or a tight matrix, making it difficult for fluids to pass through the formation to reach a low pressure area (e.g., the immediate proximity of a well). In such formations, the presence of open cracks (or "fractures") plays an important role in allowing fluids to reach a well. In many cases the reservoirs are naturally fractured, and wells can be drilled into highly fractured areas to maximize the production rate. In other cases, the fractures may be artificially generated from existing wells. In any event, it is desirable to characterize the extent and orientation of fractures in hydrocarbon reservoirs to optimize the location of future wells.

It is important to determine the extent and amount (i.e., intensity) and the orientation (i.e., azimuth) of open formation fractures in order to properly "engineer" the production of hydrocarbons from the field during both primary and secondary recovery periods. (Open formation fractures are those fractures containing brine or hydrocarbons.) In the primary recovery period, the azimuth and the intensity of the open fractures are vital considerations in properly locating and spacing production wells to maximize the production of the hydrocarbons from the fractured formation. In the secondary recovery period, the arrangement of fractures around certain wells is a vital consideration in properly injecting a drive fluid (e.g., water, gas, etc.) into the formation to force hydrocarbon flow towards one or more production wells. If an open fracture connects an injection well directly to a production well, the drive fluids will merely flow through the fracture and bypass most of remaining hydrocarbons.

Thus, it would be desirable to have a reservoir fracture characterization method that accurately identifies and quantifies in a useful way the intensity and azimuth of open fracturing throughout a subsurface formation.

SUMMARY

Accordingly, there is provided herein systems and methods of reservoir fracture characterization. In one embodiment, the method comprises: 1) obtaining seismic traces; 2) combining seismic traces into gathers that reveal acoustic reflectivity as a function of offset, azimuth, and position; 3) measuring reflection anisotropy as a function of position; 4) determining a relationship between reflection anisotropy and fracture intensity measurements at specific positions; and 5) applying the relationship to reflection anisotropy measurements to create a set of fracture intensity measurements at regularly-spaced positions.

BRIEF DESCRIPTION OF THE DRAWINGS

For a more detailed description of various exemplary embodiments, reference will now be made to the accompanying drawings, wherein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
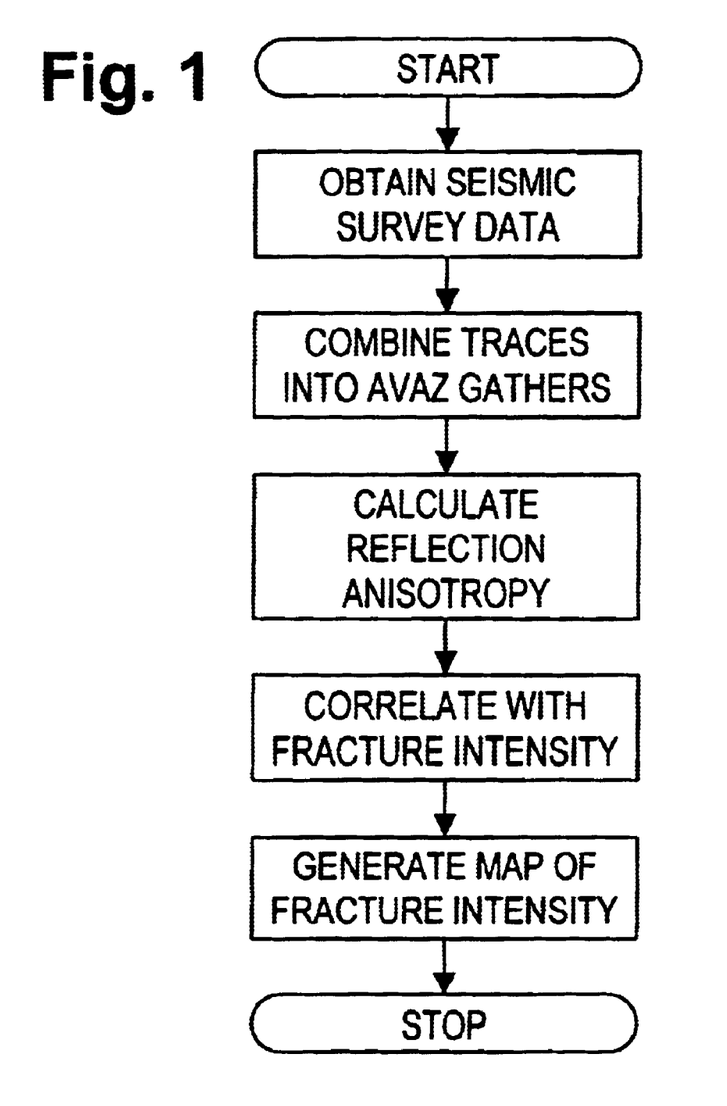
FIG. 1 shows phases of one embodiment of the reservoir fracture characterization method.

Disclosed herein are systems and methods for characterizing fractures in a hydrocarbon reservoir. In one embodiment, the disclosed reservoir fracture characterization method may proceed in five phases (see FIG. 1): 1) obtaining a seismic survey; 2) combining seismic data traces to obtain amplitude vs. offset and azimuth gathers; 3) calculating an amount and orientation of reflection anisotropy; 4) correlating reflection anisotropy (and other variables) with fracture intensity; and 5) generating a map of fracture intensity. Each of these phases is described below.

Obtaining a Seismic Survey

Figure 2:
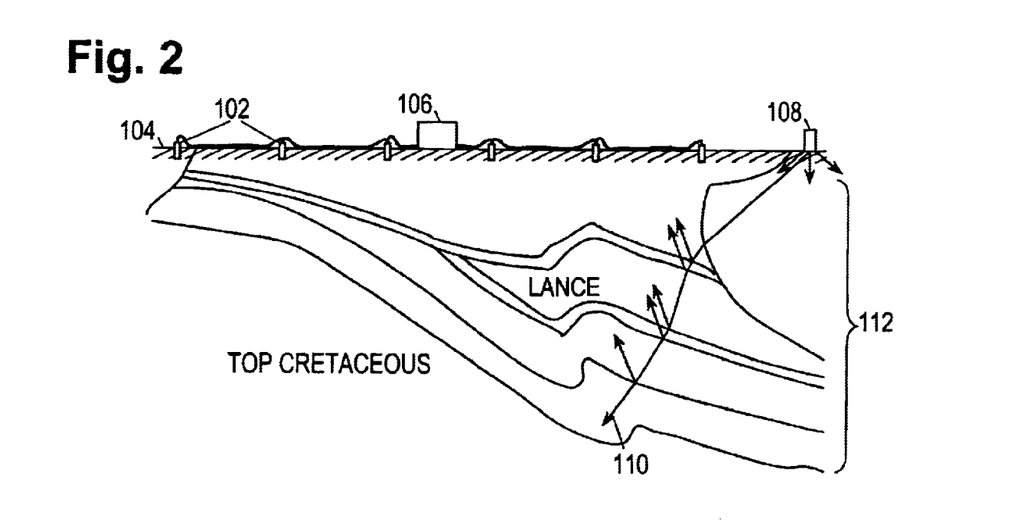
FIG. 2 illustrates a seismic survey technique.

Subsurface reservoirs are typically mapped using seismic surveys, which may be obtained as shown in FIG. 2. The disclosed systems and methods are described using information from an actual seismic survey. The area that was selected as part of this study is a 50 square mile section extracted from a seismic survey that covers more than 140 square miles over the Pinedale Anticline in the Green River Basin, Sublette County, Wyo. The subsurface layers 112 depicted in FIG. 2 represent a sedimentary section that includes the Top Cretaceous through the Lance formation. The sedimentary section includes an overpressured, heterogeneous sand-shale sequence (comprising thin individual sand/shale layers) that is nearly 5,000 feet thick. There is some coal in the section comprising less than 2% of the total rock volume. This reservoir is quite interesting, as the opportunity for future development is quite substantial.

FIG. 2 shows a set of seismic energy detectors 102 positioned in a spaced-apart arrangement (not to scale) on the earth's surface 104. The detectors 102 are coupled to a recording unit 106 that records the data collected by the detectors. A seismic energy source 108 is triggered to generate sound waves that propagate into the earth as shown by the arrows emanating from source 108. One of the arrows 110 has been extended into the earth to show the path of a particular portion of the sound waves. At each boundary between differently composed layers 112 of the earth, the sound wave is partly reflected and partly refracted (transmitted) as shown. The detectors 102 receive the reflected seismic waves and convert them into electrical signals for storage by recording unit 106.

The source 108 may be repeatedly triggered at different locations relative to the array of detectors 102. The traces from multiple firings may be recorded separately and later combined to screen out random noise and undesirable interference caused by secondary echoes of reflected waves. The data may then be processed to identify the various properties of the subsurface layers 112.

Figures 3, 4:
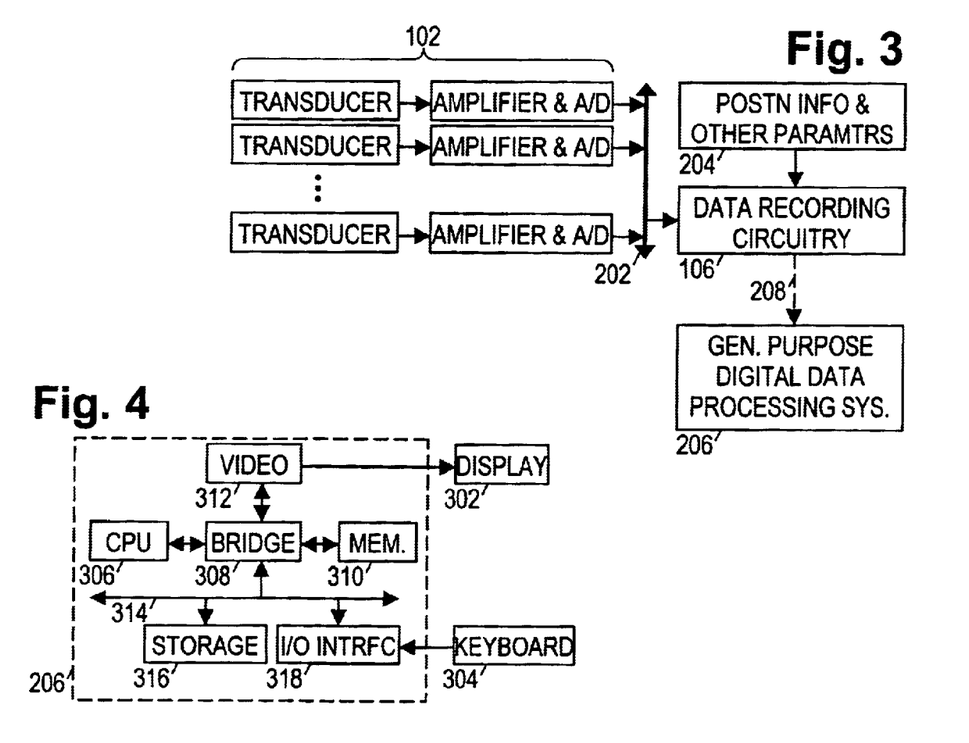
FIG. 3 shows an exemplary block diagram of a seismic survey system.
FIG. 4 shows an exemplary general purpose digital data processing system.

FIG. 3 shows an exemplary block diagram of seismic survey system electronics. The detectors 102 include transducers to convert the seismic wave energy into electric signals, and may further include electronics to filter, amplify, and convert the electric signals into digital data. The digital data may be communicated to the recording unit 106 via a bus 202, or alternatively may be communicated via a dedicated information pathway or via a wireless connection. The recording unit 106 stores the digital data on an information storage medium, along with position information for each of the detectors and any other parameters that may be useful in interpreting the stored data. The location information and other parameters may be provided via an independent interface 204 such as a user interface that allows manual entry of such information.

Recording unit 106 may use any suitable information storage medium. Due to the large volume of information to be stored, the information storage medium is generally some form of magnetic medium, e.g., disk drives or magnetic tape. However it is expected that the necessary storage capacity may also be provided by optical media or integrated circuit memories, though the associated cost may be somewhat higher. In an alternative embodiment, recording unit 106 simply gathers the data from the detectors and transmits the data in real time to a remote location such as a central storage facility.

The data collected by recording unit 106 may be communicated to a general purpose digital data processing system 206. System 206 may be responsible for performing each of the method phases from this point forward. Alternatively, the role of system 206 may be limited to preliminary processing of the seismic data, and some other computing entity may perform the disclosed method.

The communication of seismic data to system 206 may take place in any of various ways, including transmission via a wired or wireless communications link, and by physical transport of an information storage medium. System 206 may process the traces to combine information from multiple firings and to apply corrections to the traces for such effects as wave propagation delays. Resampling of the data may be performed to obtain evenly-spaced, time- or depth-synchronized samples on each of the traces, and to obtain estimated traces at interpolated positions within the detector array. The trace data may also be converted into any number of seismic attribute measurements including without limitation phase, peak amplitude, sound velocity, acoustic impedance, rock porosity, water saturation, and hydrocarbon content.

To aid in the interpretation of trace data, additional data may be gathered from existing wells. The additional data may take various forms, including core samples and digital logs of measurements made by downhole tools. The additional data used to aid in interpretation of the Pinedale Anticline survey included digital well log curves that were acquired from A2D Technologies, Inc. and processed by PetroSolutions, Inc. Because the wells in the study area suffer from substantial borehole problems and washouts, editing of the sonic and density logs to remove the effects of washouts, cycle skips, etc. was performed. Ideally, as part of the processing the sonic log would be corrected and integrated to match the checkshots. However, because checkshots for the wells at the time of this study were unavailable, the seismic stacking velocities were used instead to build the depth model and to derive a time-depth correspondence. In addition, PetroSolutions also provided a total porosity curve (PHIT), a sand fraction curve (LITHFRAC), and a 2-way travel time for each depth.

FIG. 4 shows a block diagram of an exemplary digital data processing system 206. To interact with a user, system 206 may be coupled to a text or graphical display 302, and to an input device 304. Display 302 and input device 304 may together operate as an interface between the user and system 206. That is, system 206 may perform certain actions prompted by user actuation of input device 304 and provide the user with a response via display 302.

System 206 may include a central processing unit (CPU) 306 that is coupled by a bridge 308 to a system memory 310. CPU 306 may also be coupled by bridge 308 to a video card 312 that in turn couples to display 302. CPU 306 may be further coupled by bridge 308 to an expansion bus 314. Also coupled to the expansion bus 314 may be a storage device 316 and an input/output interface 318. Input device 304 may be coupled to system 206 via input/output interface 318.

CPU 306 may operate in accordance with software stored in memory 310 and/or storage device 316. Under the direction of the software, the CPU 306 may accept commands from an operator via a keyboard or some alternative input device 304, and may display desired information to the operator via display 302 or some alternative output device. CPU 306 may control the operations of other system components to retrieve, transfer, process, and store data.

Bridge 308 coordinates the flow of data between components. Bridge 308 may provide dedicated, high-bandwidth, point-to-point buses for CPU 306, memory 310, and video card 312. In systems having alternative architectures, the bridge 308 may be omitted and the communications between the CPU 306 and all the other system components may occur via bus 314.

Memory 310 may store software and data for rapid access. On the other hand, storage device 316 may store software and data for long-term preservation. Storage device 316 may be portable, may accept removable media, may be an installed component, or may be a integrated component on a main system circuit board. Storage device 316 may also be a removable memory device such as a memory card. In addition, alternatives for storage device 316 may include a nonvolatile integrated memory, a magnetic media storage device, an optical media storage device, or some other form of long-term information storage.

Video card 312 may provide customized processing for graphics, along with data conversion from a memory-based format to a signal format suitable for display 302. Display 302 may provide data in a visual format for use by an operator. For example, display 302 may show a two dimensional map of formation fracture intensity such as that described below with reference to FIG. 9. Alternatively, display 302 may show a three dimensional volume of fracture intensity by providing a perspective view and/or by animating a two-dimensional image to illustrate data variation as a function of position.

Expansion bus 314 may support communications between bridge 308 and multiple other computer components. Bus 314 may couple to removable modular components and/or components integrated onto a circuit board with bridge 308 (e.g., audio cards, network interfaces, data acquisition modules, modems). In systems that include a network interface, the CPU 306 may access software and data via a network, thereby making it possible for system 206 to use information storage and processing resources external to system 206.

Input/output interface 318 may support communications with legacy components and devices not requiring a high-bandwidth connection. Interface 318 is coupled to input device 304, which may provide data to interface 318 in response to operator actuation. Input device 304 may be a keyboard or some other input device (e.g., pointing devices, buttons, sensors). Multiple input devices may be concurrently coupled to input/output interface 318 to provide data in response to operator actuation. Output devices (e.g., parallel ports, serial ports, printers, speakers, lights) may also be coupled to input/output interface 318 to communicate information to the operator.

In the current context, system 206 may be configured with software that processes seismic data to generate maps of fracture intensity. The software may be stored in storage device 316, and some or all of the software may be copied into memory 310 as needed for use by CPU 306. CPU 306 may retrieve the software instructions a few at a time from memory 310, and follow the procedures laid out by the software instructions to generate the desired maps. These procedures may include opportunities for interaction with a user of system 206, such as displaying fields that allow a user to identify the seismic data file to be operated on, or displaying controls that allow a user to alter processing parameters and change display characteristics.

Combining Traces into Amplitude vs. Offset and Azimuth Gathers

Figure 5:
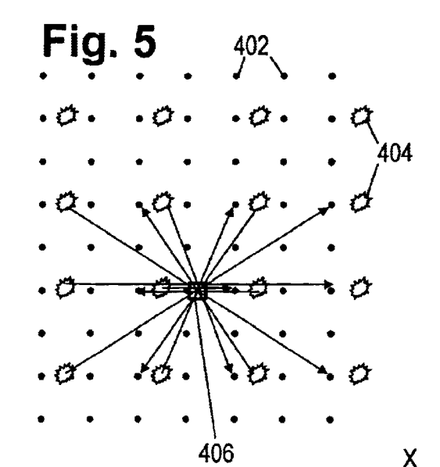
FIG. 5 shows an exemplary pattern of seismic sources and receivers that may be used to obtain data gathers.

FIG. 5 shows an exemplary pattern of seismic sources and receivers that may be used to obtain data gathers. Receivers 402 are seismic energy detectors that may be configured to detect one or more types of seismic waves. In one specific implementation, receivers 402 are configured to detect pressure waves ("P-waves"). The receivers 402 are preferably arranged in a line or two-dimensional grid (as viewed from above), though other arrangements may also be employed. While the receivers 402 are deployed, one or more seismic sources 404 may be fired (one at a time) in a number of positions relative to the receiver arrangement. The receiver arrangement may also be moved between firings to facilitate optimal data acquisition.

Figure 6:
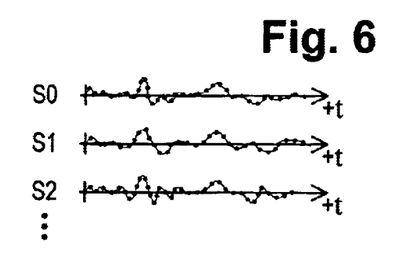
FIG. 6 shows exemplary traces obtained by seismic receivers.

In response to each source firing, each receiver records a seismic data trace (see, e.g., FIG. 6). The seismic data trace is a (preferably digital) representation of the seismic wave energy received from a source firing position at the corresponding receiver position. Accordingly, each trace corresponds to a paired source position and receiver position. To screen out noise and interference from secondary reflections, traces may be combined with other traces that share a common midpoint between the source position and receiver position. For example, FIG. 5 shows a bin 406. Bin 406 contains the midpoint of a number of source-receiver pairs. In particular, arrows are shown for the source-receiver pairs having midpoints within bin 406.

When traces having common midpoints aregrouped, the result is often termed a common midpoint (CMP) gather. Traces from a gather may be averaged or summed (possibly with weights) to form a stacked trace, or more simply, a "stack". (Note that before combining traces into a stack, it is generally desirable to apply a time-scaling function to the individual traces to account for different travel times). Often, a CMP gather will be a combination of a great number (often hundreds) of traces. It is often possible to subdivide the traces sharing a common midpoint into groups based on their offset (distance of the receiver from the source) or their incident angle (the angle at which the seismic energy reflects in the subsurface) and their azimuth (the azimuth at which the seismic energy reflects in the subsurface which is often close to the direction of the receiver from the source). Symmetry may allow azimuths 180° apart to be considered together. When traces having a common midpoint (within a defined range), a common offset (within a defined range) and a common azimuth (within a defined range) are grouped, the result is termed an "amplitude vs. offset and azimuth (AVAZ) gather".

Calculating Reflection Anisotropy

Weighted stacks formed from the AVAZ gathers reveal acoustic reflectivity as a function of position (x and y coordinates of the midpoint, time or depth coordinate from the gather), offset, and azimuth. It can be shown that the offset and azimuth dependency of the acoustic reflectivity is an indication of the intensity and orientation of fractures in the formation. A theoretical model of the offset and azimuth dependency of acoustic reflectivity may be determined by assuming uniformly oriented fractures in the formation. The model indicates a reflection anisotropy which may be aligned with the fractures or may be orthogonal to the fractures, depending on the relative fracture density on each side of the formation boundary.

A measurement of this dependency may be made using a statistical fit (e.g., a least-squares fit) between the theoretical model and measured dependency. The amount of the anisotropy (and hence, the indication of fracture intensity) may be measured from the maximum difference in slopes of the reflectivity coefficient vs. offset and azimuth. This difference of the slopes may be used as the anisotropy measurement.

An existing commercial package called FractAL was used on the study data to perform this measurement. The time-scaling velocity function used to flatten the gathers employed the final processing velocities. Offsets analyzed were from 2,000 feet to 12,000 feet with 7×7 CMP super-bins (770'×770'). The analysis time window was 3,500 ms long from 0 to 3,500 ms. The anisotropy measurement and orientation was obtained in the form of "wiggle" traces, i.e., a time (or depth) sequence of digital values for each midpoint bin. Related measurements were also obtained from FractAL including an envelope function of the anisotropy measurement, along with P-wave and S-wave reflectivity values estimated at zero incident angle. (The envelope of a measurement is can be considered as fitting a line or curve to the local extremes of the measurement and is typically done using Hilbert transforms.) If well logging data is available for any of various borehole wall imaging tools, the additional information may be used to assist in the determination of fracture (and anisotropy) orientation.

Correlation with Fracture Intensity

Figure 7:
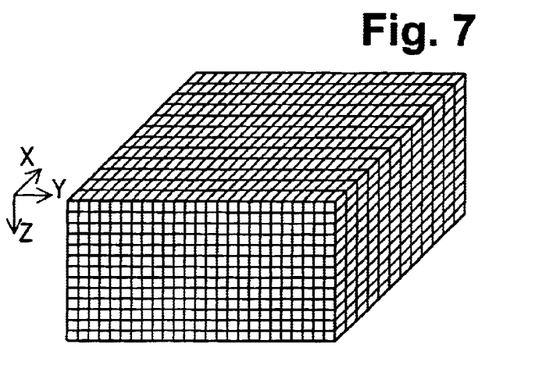
FIG. 7 shows a conceptual three dimensional data model.

The reflection anisotropy measurements (and other variables) are next correlated with a measure of fracture intensity. As part of this process, a data model of the formation may be constructed to allow relationships to be established between different variables. The data model of a formation can be expressed in terms of a two-dimensional array of cells (e.g., a horizontal map grid, or a vertical cross-section of the formation), or in terms of a three dimensional volume of cells (see, e.g., FIG. 7). Note that the cells may be irregular, e.g., in some embodiments the cells are defined with respect to formation boundaries. Each cell has corresponding position coordinates (although the depth coordinate may be interchanged with a time coordinate), and may also have one or more associated seismic attribute measurements. In the preferred embodiment, the data model includes at least the reflection anisotropy measurement or the envelope of the reflection anisotropy measurement. Other available seismic attribute data may also be incorporated into the data model.

In the present example, the data model is a three-dimensional volume that includes the reflection anisotropy measurement, the envelope of the reflection anisotropy measurement, the zero-incidence P-wave reflectivity, the coherence of the zero-incidence P-wave reflectivity, the coherence of the zero-incidence S-wave reflectivity, the total porosity, the sand fraction, a coal indicator, and acoustic velocity. In addition, horizons (formation boundaries) were identified. The additional data was obtained using seismic survey data and extrapolation of data obtained from well logs. The obtaining of the additional data is now described in greater detail.

In the present example, a number of existing wells (about 20) are located in the study area. The well locations were derived from a variety of sources and the discrepancies reconciled. A gamma ray log curve was used to identify formation boundaries ("tops") at approximately eighteen well locations for four boundaries (Top Tk, Upper Lance, Mid Lance, and Lower Lance). Not all tops could be found in all wells. The tops were used with the seismic data to identify formation boundaries. The tops and formation boundaries were used as part of a technique for inverting seismic data to obtain acoustic impedance measurements in each formation.

The acoustic impedance inversion technique involved the derivation of a wavelet to "zero" the phase of the seismic data relative to the well logs, allowing a determination of acoustic impedance measurements from the seismic data. The acoustic impedance measurements were adjusted to account for acoustic reflectivity data obtained from well logs. A time-depth relationship for the formation boundaries was established using the boundary depths obtained from the well logs. The average acoustic velocity for each of the formations at the well locations was calculated, and then spatial interpolation was used to obtain average velocity measurements throughout the data volume. This allowed conversion of the time coordinate to a depth coordinate, and a three-dimensional spatial data volume was determined, i.e., a data model having three spatial coordinate rather than two spatial coordinates and a time axis. At this point, the data model included acoustic impedance, acoustic velocities, and indicators of formation boundaries. Three additional formation properties were modeled from the well data. A coal indicator, a sand fraction measurement, and a total porosity measurement were obtained and interpolated (with a kriging technique) between the wells.

Having determined a data model with a number of variables, it is now desired to determine a correlation between each of the variables and formation fracture intensity. True fracture intensity is rarely available, but in some tight (i.e., having a high resistance to fluid flow) gas reservoirs, production is related to the amount of fracturing in the reservoir. In these cases, a measure of production can be used as a proxy for fracture intensity, i.e., as a fracture indicator. As an added advantage, the final maps or output data volumes may serve as a prediction as to the measure of production. Alternative measures of fracture intensity may be employed, e.g., fracture intensity calculations from borehole image logs and/or core data.

Among the data available from the existing wells is the four-month cumulative production. Because of the foregoing relationship between production rate and fracture intensity, this cumulative production measure is taken as a measure of fracture intensity at the well site. However, this measure of fracture intensity had only two-dimensional coordinates (i.e., the well location) due to the lack of completion information (i.e., the depth and amount produced from each completion zone). Accordingly, a two-dimensional data model was extracted from the three-dimensional data model by averaging the three-dimensional seismic attribute values in the vertical direction.

Each of the two-dimensional data model measurements at the well locations was correlated with the fracture intensity measurement (i.e., four-month cumulative production), preferably using a modified rank-correlation technique. A suitable rank-correlation technique is described in a paper by Patrick Wong and Sean Boerner, "Ranking Geological Drivers: A Comparison Study", which is hereby incorporated by reference. Rank correlation involves correlating ranks of the measurements (in terms of value) rather than correlating the measurement values themselves. Other correlation techniques may also be used.

Figure 8:
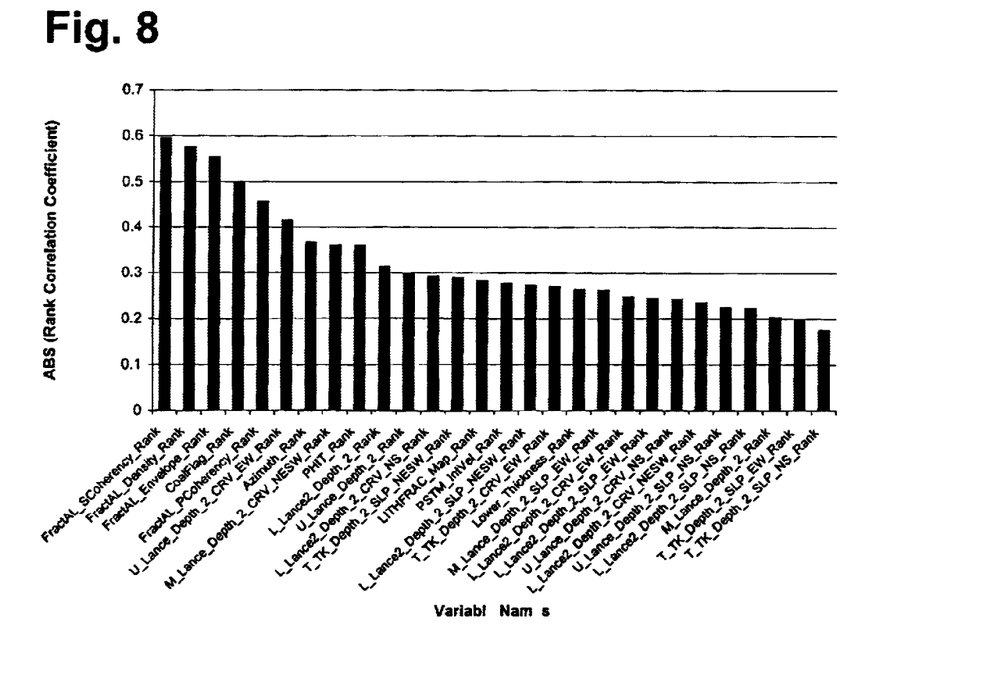
FIG. 8 shows an exemplary sorted arrangement of rank-correlated independent variables.

FIG. 8 shows correlation results for the present example. Of the significant number of variables included in the data model, only a relatively small number (e.g., five) are significantly correlated with the fracture intensity. An additional analysis step may be performed by correlating these variables with each other. Very highly-correlated variables may be considered redundant, and accordingly, unnecessary variables may be dropped from further consideration. For example, the reflection anisotropy measurement and the envelope of the reflection anisotropy measurement were found to have a rank correlation coefficient of over 0.95. The envelope measurement was accordingly eliminated from further analysis, but this was not required.

Generating a Map of Fracture Intensity

Next, a relationship is established between the fracture intensity measurements and the variables from the data model having significant correlation with the fracture intensity. This relationship may take the form of an equation determined using a multiple regression technique. Alternatively, this relationship may take the form of a neural network, or a combination of neural network and multiple regression techniques.

Figure 9:
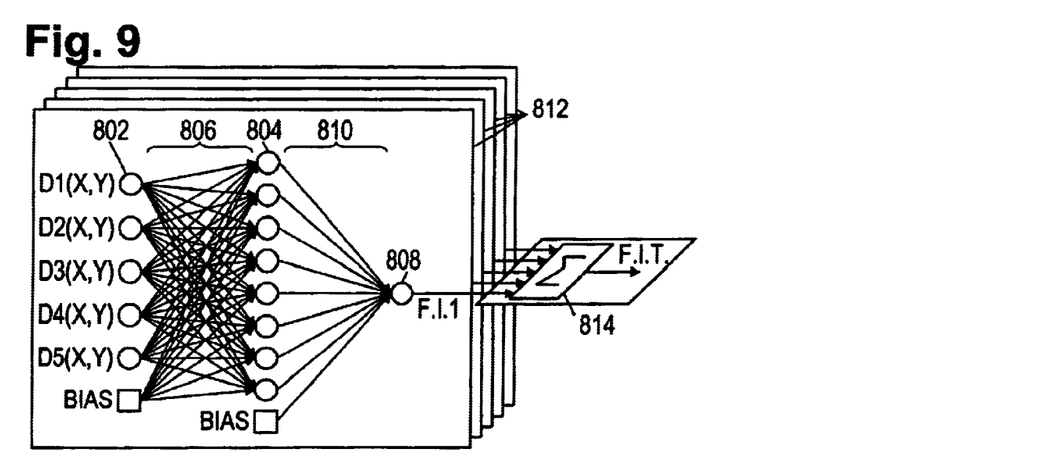
FIG. 9 shows an exemplary neural network arrangement that may be used to generate two-dimensional and three-dimensional maps from the independent variables.

FIG. 9 shows a neural network having a set of input neurons 802, a set of "hidden" neurons 804, and an output neuron 808. Each of the input neurons 802 is connected to each of the hidden neurons 804 by a weighted connection 806. Similarly, each of the hidden neurons is connected to the output neuron 808 by a weighted connection 810. The hidden neurons 804 and output neuron 808 calculate a weighted sum (or other weighted combination) of the neuron outputs from the preceding layer. During a training process, the connection weights are updated in accordance with any suitable training algorithm that "teaches" the neural network to recognize relationships between the set of input values and the known output values. In a preferred embodiment, the neural network includes eight hidden neurons (plus a hidden bias neuron) and employs a back-propagation training rule. The back-propagation training method provides a steepestdescent gradient search for optimal weight coefficients. The weights are modified to reduce the error between the fracture intensity measure and the value predicted by the neural network. The training continues until a user defined threshold is reached. Other training methods may be employed, e.g., a conjugate gradient search.

FIG. 8 shows five variables $D_i(x,y)$ and a fixed bias value being provided as output values from input neurons 802. The hidden neurons 804 (except for one fixed bias neuron) determine their respective output values as weighted combinations of the values provided by the input neurons 802, and subsequently the output neuron 808 determines its respective output value as a weighted combination of the values provided by the hidden neurons 804. During the training phase, the connection weights are updated based on the difference between the desired output value and the actual output value.

Also shown in FIG. 9 are multiple neural network realizations 812. The use of multiple realizations is optional, but if included, the different realizations may be obtained by performing training on different subsets of the available training data. Alternatively, or in addition, different realizations may be trained on different groups of model variables. For example, one of the neural network realizations may be trained using the reflectivity anisotropy measurement (and other variables), while another realization may be trained using the envelope of the reflectivity anisotropy measurement. Multiple realizations may also be obtained by starting the training procedure with different (e.g., random) initial weight coefficients in the neural network.

Figure 10:
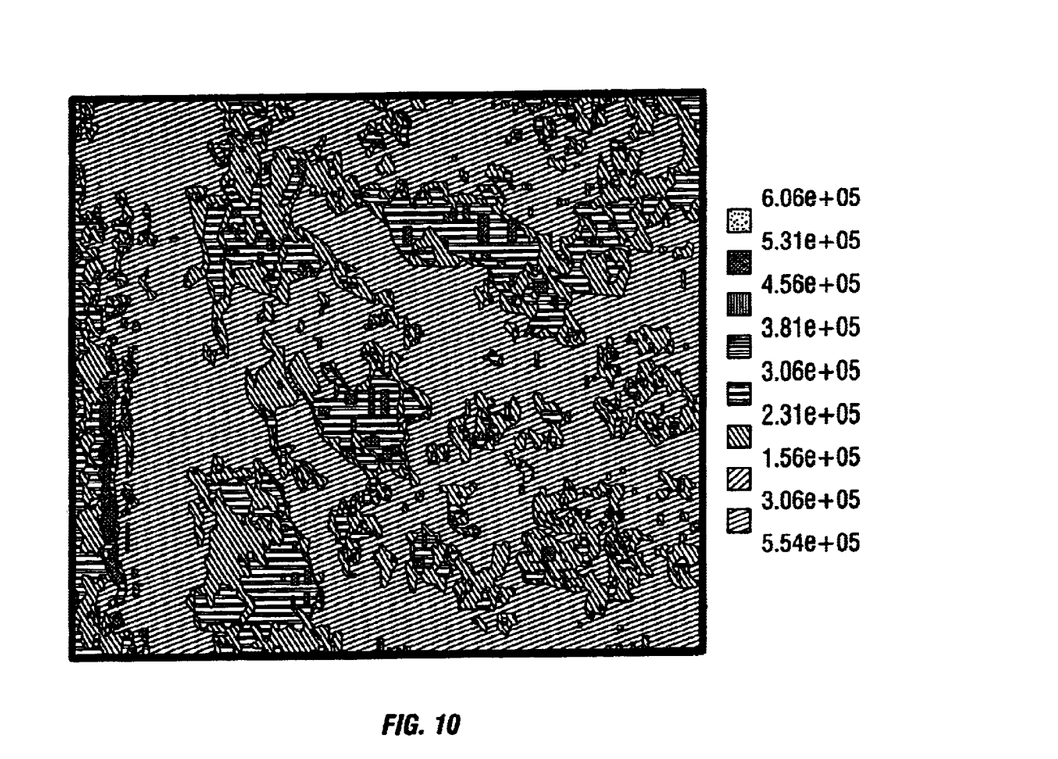
FIG. 10 shows an example of a two-dimensional map produced by an embodiment of the disclosed method.

Once the neural network(s) have been trained, a map of fracture intensity may be generated by systematically applying the variable measurements from the data model (i.e., as a function of position) and determining the corresponding fracture intensity output value. Where multiple realizations are used, the multiple outputs may be combined 814 (e.g., summed or averaged or analyzed statistically) to obtain a total fracture intensity value. FIG. 10 shows a fracture intensity map for the current example.

A three-dimensional volume may be generated by applying variable measurements from a three-dimensional data model to the neural network(s). An additional normalization step may be included to scale the output data values from the three dimensional volume so that the vertical average of the data values equals the corresponding data value from a two-dimensional map.

In the present example, the neural network was implemented using an existing tool called "ResFrac" (or "SUREFrac" in a later version). ResFrac related multiple geologic and geophysical "drivers" to fracture intensity. ResFrac may be used to output maps of fracture intensity and may do some post-processing to calculate average and uncertainty maps. The drivers that are input into ResFrac may be either two-dimensional maps or three-dimensional volumes of reservoir properties. In addition to the data model variables provided, ResFrac may generate additional variables from the structural model (i.e., the identified formation boundaries). ResFrac may use the structural model to calculate the first and second derivative surfaces in four directions (N-S, E-W, NE-SW, NW-SE).

ResFrac created a number of neural network realizations. Each realization was the result of a neural network that was trained on a different portion of the data. ResFrac uses the correlation coefficient as a test as to how well the neural network is trained and also how well the model fits on the test dataset. The percentage of well data that is included in the training set is a user-defined parameter. The data that is not used in the training set is put into the test set. In this example, 30 realizations were created. The training correlation coefficient was set to be 0.75, and the testing correlation coefficient was set to be 0.6. Seventy percent of the wells were included in the training.

Benefits associated with the present invention may include (1) more accurate location of fracture swarms; (2) improved volumetric and fracture connectivity analysis; (3) reduced cycle time in developing fractured reservoirs; (4) earlier fractured reservoir characterization with fewer wells through the use of seismic data; and (5) the ability to iterate and improve fractured reservoir models quickly when new seismic and well information is obtained.

What is claimed is:

1. A method of reservoir fracture characterization, the method comprising:

obtaining seismic traces;

combining seismic traces into gathers that reveal acoustic reflectivity as a function of offset, azimuth, and position;

measuring reflection anisotropy as a function of position;

determining a relationship between reflection anisotropy and fracture intensity measurements at specific positions; and applying the relationship to reflection anisotropy measurements to create a set of fracture intensity measurements at regularly-spaced positions.

2. The method of claim 1, wherein the specific positions are locations of preexisting wells.

3. The method of claim 2, wherein the fracture intensity measurements take form as a production measure.

4. The method of claim 3, wherein the production measure is a four month cumulative fluid production.

5. The method of claim 1, wherein said determining a relationship includes using multiple regression to identify a statistical dependence of the fracture intensity measurement on reflection anisotropy.

6. The method of claim 1, wherein said determining a relationship includes training a neural network to predict a fracture intensity measurement in response to a set of input values, the set including reflection anisotropy.

7. The method of claim 1, further comprising:

displaying the set of fracture intensity measurements as function of two spatial dimensions.

8. The method of claim 7, wherein the set of fracture intensity measurements is displayed as a map.

9. The method of claim 1, further comprising:

displaying the set of fracture intensity measurements as a function of three spatial dimensions.

10. The method of claim 1, further comprising:

correlating a set of seismic attributes with the fracture intensity measurements at specific positions, wherein the set of seismic attributes includes reflection anisotropy, wherein said determining a relationship between reflection anisotropy and fracture intensity measurements further includes determining a relationship between fracture intensity and those seismic attributes are well-correlated with the fracture intensity measurements.

11. The method of claim 10, wherein said correlating is performed using a rank-correlation technique.

12. A system for reservoir fracture characterization, the system comprising:

an information storage device having seismic traces; and a processor configured to retrieve and process the seismic traces to determine an array of reflection anisotropy values, wherein the processor is further configured to determine a relationship between reflection anisotropy and measure of fracture intensity at one or more well positions, wherein the processor is configured to determine said relationship using multiple regression.

13. The system of claim 12, wherein the measure of fracture intensity relates to fluid production from wells at the one or more well positions.

14. The system of claim 12, further comprising:

a graphical display coupled to the processor and configured to present a view of fracture intensity measurements as a function of position, wherein the processor is configured to generate said view by applying said relationship to an array of reflection anisotropy values.

15. The system of claim 14, wherein the display presents fracture intensity measurements as a function of two spatial dimensions.

16. The system of claim 14, wherein the display presents fracture intensity measurements as a function of three spatial dimensions.

17. A system for reservoir fracture characterization, the system comprising:

an information storage device having seismic traces; and a processor configured to retrieve and process the seismic traces to determine an array of reflection anisotropy values, wherein the processor is further configured to determine a relationship between reflection anisotropy and a measure of fracture intensity at one or more well positions, wherein the measure of fracture intensity is a four month cumulative fluid production.

18. The system of claim 17, wherein the processor is configured to determine said relationship by training one or more neural networks.

* * * * *